United States Patent
Kyou

(10) Patent No.: US 10,512,110 B2
(45) Date of Patent: Dec. 17, 2019

(54) WIRELESS COMMUNICATION METHOD, WIRELESS COMMUNICATION DEVICE, ELECTRONIC WATCH, AND NON-TRANSITORY RECORDING MEDIUM

(71) Applicant: CASIO COMPUTER CO., LTD., Tokyo (JP)

(72) Inventor: Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/069,945

(22) PCT Filed: Nov. 17, 2016

(86) PCT No.: PCT/JP2016/084157
§ 371 (c)(1),
(2) Date: Jul. 13, 2018

(87) PCT Pub. No.: WO2017/122429
PCT Pub. Date: Jul. 20, 2017

(65) Prior Publication Data
US 2019/0029060 A1    Jan. 24, 2019

(30) Foreign Application Priority Data
Jan. 15, 2016  (JP) .................... 2016-006284

(51) Int. Cl.
*H04B 7/00* (2006.01)
*H04W 76/14* (2018.01)
(Continued)

(52) U.S. Cl.
CPC ........... *H04W 76/14* (2018.02); *H04W 76/10* (2018.02); *H04W 76/30* (2018.02)

(58) Field of Classification Search
CPC .. H04W 4/80; H04W 12/00407; H04W 8/005
(Continued)

(56) References Cited

U.S. PATENT DOCUMENTS 7,317,712 B2 *  1/2008  Ishimura .............. H04L 9/0841
                                                    370/338
9,888,452 B2 *  2/2018  Logan .................. H04W 68/00
(Continued)

FOREIGN PATENT DOCUMENTS

EP      2 304 978 A1     4/2011
JP      2013-214257 A   10/2013
(Continued)

OTHER PUBLICATIONS

International Search Report and Written Opinion dated Dec. 27, 2016 issued in PCT/JP2016/084157.
(Continued)

*Primary Examiner* — Sonny Trinh
(74) *Attorney, Agent, or Firm* — Scully Scott Murphy & Presser

(57) ABSTRACT

In a pairing establishment process, a controller (220) of a central (200) notifies a peripheral of the application identification information on the central (200). The controller (220) of the central (200) stores the device identification information on the peripheral received therefrom in a ROM (240). The application identification information is information to identify an application (that is, software) owned by the central (200). The application is to perform various communications with the peripheral.

16 Claims, 5 Drawing Sheets

(51) Int. Cl.
*H04W 76/10* (2018.01)
*H04W 76/30* (2018.01)

(58) Field of Classification Search
USPC ........................................................ 455/41.2
See application file for complete search history.

(56) References Cited

U.S. PATENT DOCUMENTS

| | | | |
|---|---|---|---|
| 9,961,669 B2* | 5/2018 | Chapelot | H04B 5/0031 |
| 2007/0080823 A1 | 4/2007 | Fu et al. | |
| 2011/0177780 A1 | 7/2011 | Sato et al. | |
| 2012/0322379 A1 | 12/2012 | Eun et al. | |
| 2013/0189924 A1 | 7/2013 | Pedro et al. | |
| 2014/0287686 A1 | 9/2014 | Kobayashi | |
| 2015/0081823 A1 | 3/2015 | Gao et al. | |
| 2016/0196740 A1* | 7/2016 | Park | G08C 17/02 340/12.28 |
| 2016/0253710 A1* | 9/2016 | Publicover | H04W 4/21 705/14.66 |
| 2018/0034954 A1* | 2/2018 | Yang | H04M 1/725 |
| 2018/0188925 A1* | 7/2018 | Na | G04G 9/0064 |
| 2018/0352435 A1* | 12/2018 | Donley | H04W 12/06 |

FOREIGN PATENT DOCUMENTS

| | | |
|---|---|---|
| JP | 2014-517639 A | 7/2014 |
| JP | 2014-187487 A | 10/2014 |
| WO | 2015/034249 A1 | 3/2015 |

OTHER PUBLICATIONS

Japanese Office Action dated Dec. 20, 2016 issued in JP 2016-006284.
Extended European Search Report dated May 27, 2019 received in European Patent Application No. EP 16885032.9.

* cited by examiner

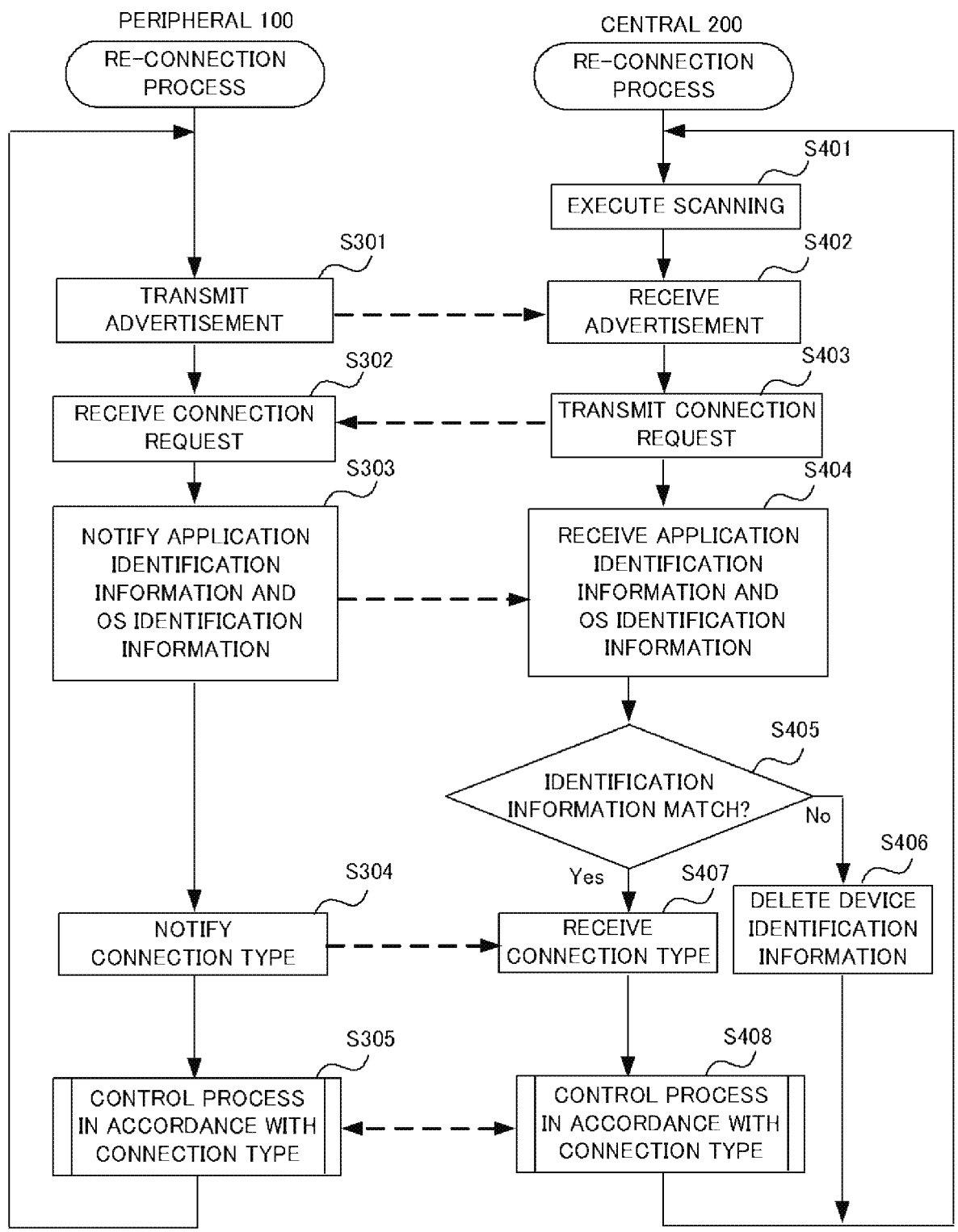

WIRELESS COMMUNICATION METHOD, WIRELESS COMMUNICATION DEVICE, ELECTRONIC WATCH, AND NON-TRANSITORY RECORDING MEDIUM

TECHNICAL FIELD

The present disclosure relates to a wireless communication method, a wireless communication device, an electronic watch, and a non-transitory recording medium.

BACKGROUND ART

In recent years, wireless communication devices that perform wireless communication based on Bluetooth (Registered Trademark) which is a short-range wireless communication standard are becoming popular.

For example, Patent Literature 1 discloses a terminal interlinking system provided with a terminal device and a portable terminal device which are connected together via a short-range wireless communication. According to this system, a pairing that shares a shared key between the terminal device and the portable terminal device is performed. When re-establishing a connection to the terminal device having already undergone the pairing, the portable terminal device logs in the Operating System (OS) of the terminal device using the shared key, and establishes the connection to the terminal device.

For example, the short-range wireless communication and pairing by the terminal interlinking system disclosed in Patent Literature 1 that is a Patent Literature in Japan are performed among a smartphone, an electronic watch, and a wireless communication device which are now widely utilized. Note that the term "pairing" means a process of mutual authentication between wireless communication devices which establish a communication first time, and of registration of the information on the communication partner wireless communication device. In addition, when re-establishing a connection to the wireless communication having already undergone the pairing before, the wireless communication device establishes the communication while omitting the process like the mutual authentication.

In this case, some wireless communication devices that perform a short-range wireless communication are capable of establishing a pairing to only a single wireless communication device. An example is an electronic watch that is capable of establishing a pairing to only a single smartphone.

When such a wireless communication device is to be connected to another wireless communication device not having undergone the pairing before, a user is not able to give an operation for a pairing to another wireless communication device unless the user has given an operation for canceling the already established pairing.

In the case of, for example, the terminal interlinking system disclosed in Patent Literature 1, the operation for canceling the pairing is an operation for deleting the information on the shared key stored in the respective memories of the terminal device and the portable terminal device.

In addition, in the case of an electronic watch that is capable of establishing a pairing to only a single smartphone, when a start-over of pairing due to an error originating from the updating of the OS in the smartphone becomes necessary, the above deletion operation is necessary to cancel the already established pairing.

As explained above, according to the structures of conventional wireless communication devices that perform short-range wireless communication, in order to cancel the pairing, the operation for deleting the information on the shared key, and the like, from the memory of each wireless communication device is necessary. Hence, the operation still has a leeway for simplification. In addition, the operation for re-establishing the pairing once the pairing is canceled also has a leeway for simplification.

When, in particular, the shared key is shared as the pairing information like Patent Literature 1, and when the pairing information is deleted from the memory of only either wireless communication device, a future operation, such as whether to generate new pairing information to start over the pairing when re-establishing the connection or to delete the pairing information left in the memory of the other wireless communication device, is unclear. Such an unclear operation or control process may become an event that causes an error.

CITATION LIST

Patent Literature

[PTL 1]
Unexamined Japanese Patent Application Kokai Publication No. 2013-214257

SUMMARY OF INVENTION

Technical Problem

According to the structure that involves the non-simplified operation relating to the pairing and the occurrence of an error originating therefrom, the user friendliness decreases. Even if the operating relating to the pairing is not a user operation but an automatic control process, such a control process is not still simple.

Hence, the present disclosure has been made in view of the foregoing circumstances, and an objective is to provide a wireless communication method, and the like, that simplify an operation relating to a pairing, thereby improving a user friendliness.

Solution to Problem

In order to accomplish the above objective, a wireless communication method according to a first aspect of the present disclosure includes:
a notification step for notifying a wireless communication device of application identification information on a local device; and
a storing step for storing device identification information on the wireless communication device received therefrom in a memory of the local device.

In addition, in order to accomplish the above objective, a wireless communication device according to a second aspect of the present disclosure comprises a controller, a memory, and a wireless communicator,
in which the controller:
causes the wireless communicator to receive application identification information on a second wireless communication device therefrom;
stores the application identification information in the memory; and
causes the wireless communicator to transmit the application identification information stored in the memory to the second wireless communication device when attempting a connection to the second wireless communication device.

Still further, in order to accomplish the above objective, a wireless communication method according to a third aspect of the present disclosure includes:

a storing step for receiving application identification information on a wireless communication device therefrom, and storing the received information in a memory of a local device; and a notification step for notifying the wireless communication device of the stored application identification information when a connection to the wireless communication device is attempted.

Advantageous Effects of Invention

With the present disclosure, it is possible to simplify an operation relating to a pairing, thereby improving a user friendliness.

BRIEF DESCRIPTION OF DRAWINGS

FIG. 5 is a flowchart illustrating an example re-connection process between the peripheral and the central.

DESCRIPTION OF EMBODIMENTS

Embodiment

Figure 1:
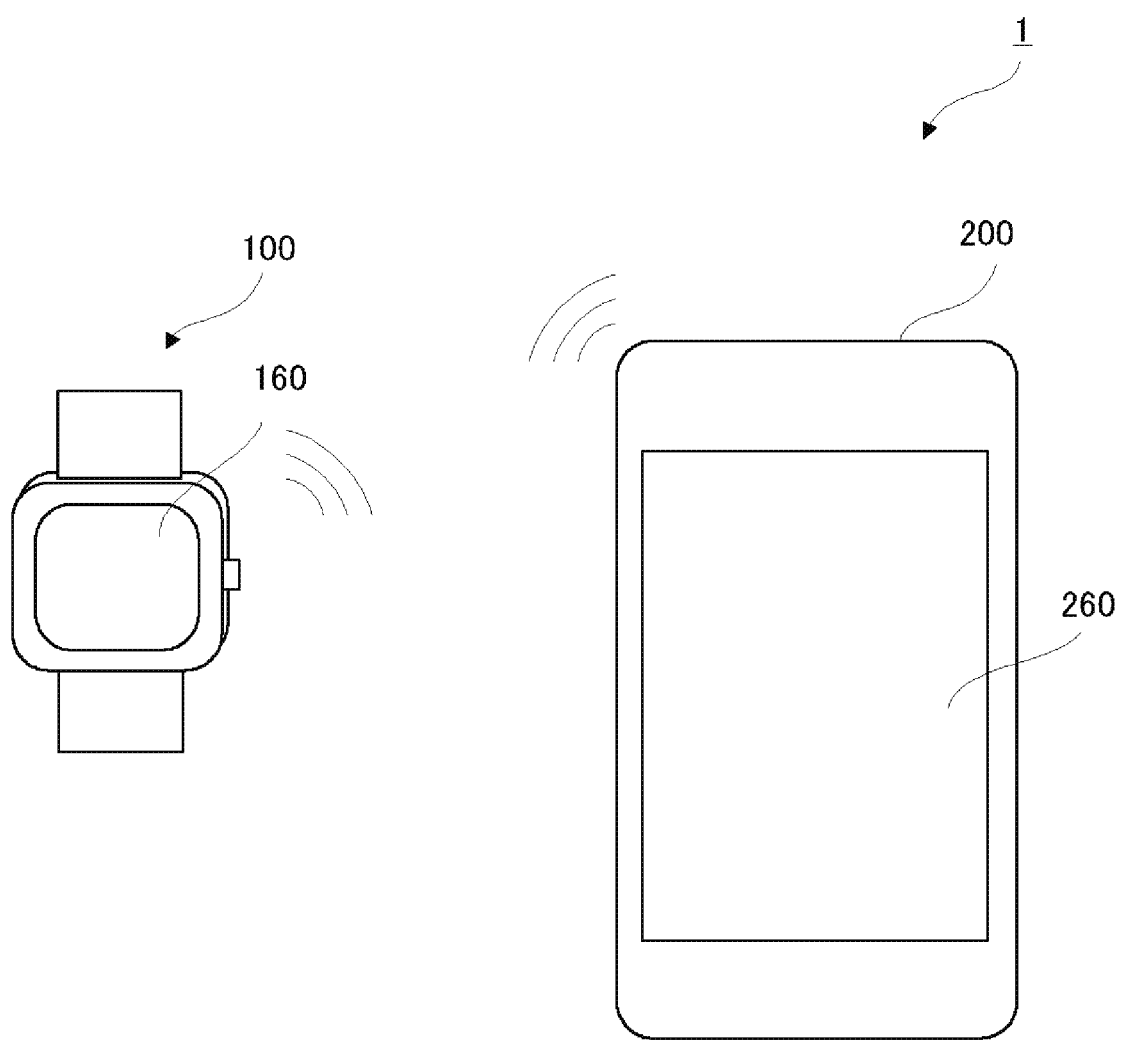
FIG. 1 is a diagram illustrating an example structure of a wireless communication system according to an embodiment.

Embodiments according to the present disclosure will be explained below with reference to the figures. As illustrated in FIG. 1, a wireless communication system 1 according to an embodiment of the present disclosure includes a peripheral 100 that is a wireless communication device, and a central 200 that is the other wireless communication device different from the peripheral 100.

The peripheral 100 and the central 200 perform wireless communications with each other based on Bluetooth (Registered Trademark) Low Energy (hereinafter, referred to as "BLE"). The term BLE is a standard (mode) defined for the purpose of low energy consumption in a short-range wireless communication standard called Bluetooth (Registered Trademark).

In this case, the peripheral 100 provides a service to the central 200. The central 200 utilizes the provided service from the peripheral 100.

The peripheral 100 and the central 200 are each a mobile phone, a smartphone, a tablet type personal computer, a laptop type personal computer, or a watch which is portable and which has a wireless communication function based on the BLE.

In this embodiment, as an example, the peripheral 100 is an electronic watch, while the central 200 is a wireless communication terminal which receives various pieces of data from the peripheral 100, and which displays the received data on a display 260.

Figure 2:
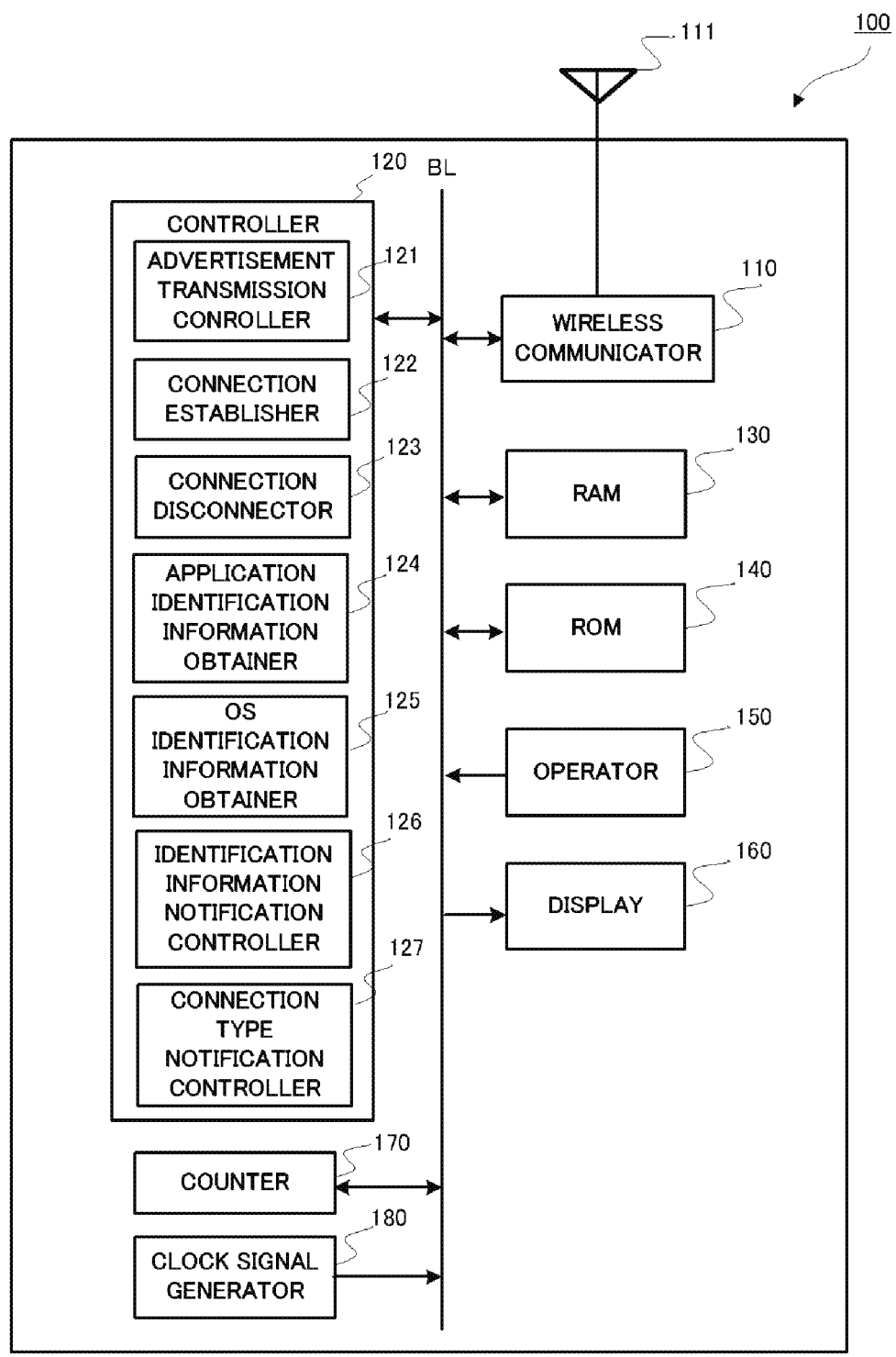
FIG. 2 is a block diagram illustrating an example structure of a peripheral according to an embodiment.

A structure of the peripheral 100 according to this embodiment will be explained below. As illustrated in FIG. 2, the peripheral 100 includes a wireless communicator 110, a controller 120, a Random Access Memory (RAM) 130, a Read Only Memory (ROM) 140, an operator 150, a display 160, a counter 170, and a clock signal generator 180, all connected together via a bus line BL.

The wireless communicator 110 includes, for example, a Radio Frequency (RF) circuit, a Base Band (BB) circuit, and a Large Scale Integration (LSI) circuit. The wireless communicator 110 transmits and receives signals via an antenna 111, and performs a wireless communication to the central 200 that is the other wireless communication device based on the BLE.

The controller 120 includes, for example, a Central Processing Unit (CPU). The controller 120 executes various programs (for example, programs to accomplish a pairing establishment process and a re-connection process both to be explained later) stored in the ROM 140, thereby controlling the entire action of the peripheral 100.

The RAM 130 includes a volatile memory, and is utilized as a work area to temporarily store data in order to enable the controller 120 to execute various processes.

The ROM 140 includes a non-volatile memory like a flash memory, and stores the various programs and data for enabling the controller 120 to control various functions.

The operator 150 is an interface which includes operation buttons, a touch panel, and the like, and allows a user to enter an instruction.

The display 160 includes, for example, a Liquid Crystal Display (LCD) or an Electro Luminescence (EL) display, and displays an image in accordance with image data input from the controller 120.

The counter 170 includes a counter circuit that counts the number of pulses of the clock signal from the local device (peripheral device 100). The counter 170 checks the clock time based on the counted number of pulses. In addition, the controller 120 executes various controls at a timing based on the counted number of pulses by the counter 170.

The clock signal generator 180 includes a crystal oscillator that generates a reference clock, and a variable Phase Locked Loop (PLL) circuit that generates a clock signal at a desired frequency from the reference clock, and the like, and generates the clock signal of the local device (peripheral 100). The frequency of the clock signal is to be controlled by changing the frequency dividing ratio by the variable PLL circuit.

Next, a functional structure of the controller 120 in the peripheral 100 will be explained.

The controller 120 functions as an advertisement transmission controller 121, a connection establisher 122, a connection disconnector 123, an application identification information obtainer 124, an OS identification information obtainer 125, an identification information notification controller 126, and a connection type notification controller 127.

The advertisement transmission controller 121 transmits an advertisement to the central 200 via the wireless communicator 110 and the antenna 111. The advertisement is to be transmitted at a constant timing in accordance with a program process, or at a timing at which a user operation occurs.

In this case, the term advertisement means announcement information for the presence of the local device, and contains device identification information. The device identification information is the device address of the peripheral 100 or a Universally Unique Identifier (UUID) thereof.

The connection establisher 122 establishes a connection to the central 200 upon reception of the connection request therefrom via the antenna 111 and the wireless communicator 110. This connection establishment enables a data communication with the central 200.

The connection disconnector 123 disconnects the connection to the central 200 upon reception of the disconnection request for a disconnection from the central 200 via the antenna 111 and the wireless communicator 110.

The application identification information obtainer 124 obtains application identification information from the central 200 via the antenna 111 and the wireless communicator 110.

In this case, the term application identification information is information to identify an application (that is, software) owned by the central 200. The application identification information is unique identification information generated using a random value generating Application Programming Interface (API) of the OS in the central 200 when the application is installed therein. The application identification information is represented by, for example, the hex number of 10 octet. Note that the application is to perform various communications with the peripheral 100 (that is, electronic watch).

The OS identification information obtainer 125 obtains OS identification information from the central 200 via the antenna 111 and the wireless communicator 110.

In this case, the term OS identification information is information to identify the OS owned by the central 200, and contains information indicating, for example, android or iOS. The data to be transmitted and received between the peripheral 100 and the central 200 varies depending on the OS identification information. For example, depending on the OS identification information, the device identification information may be a device address, or may be an UUID. Hence, the peripheral 100 communicates with the central 200 under a communication condition based on the obtained OS identification information.

Note that the application identification information obtained by the application identification information obtainer 124, and the OS identification information obtained by the OS identification obtainer 125 are associated with each other, and stored in the ROM 140.

The identification information notification controller 126 reads the application identification information and the OS identification information stored in the ROM 140. Next, the identification information notification controller 126 causes the wireless communicator 110 to transmit those pieces of application identification information and OS identification information, thereby giving a notification to the central 200.

The connection type notification controller 127 causes the wireless communicator 110 to transmit a connection type, thereby giving a notification to the central 200.

In this case, the term connection type is information indicating the purpose of a connection to the central 200 from the peripheral 100. The connection type indicates various purposes, such as to execute the pairing establishment process, to execute the data communication via a normal connection, to automatically synchronize the clock, to synchronize the clock in accordance with the user operation, and to search the central 200 from the peripheral 100. The connection type is determined in accordance with the details of the user operation given from the peripheral 100. When, for example, the user depresses the operation button of the peripheral 100 for a long time, the controller 120 thereof determines the connection type that is to execute the pairing establishment process, and when the user depresses the operation button for a short time, the controller 120 determines the connection type to establish a normal connection for the data communication.

The structure of the peripheral 100 according to this embodiment has been explained above. Next, an explanation will be given of a structure of the central 200 according to this embodiment.

Figure 3:
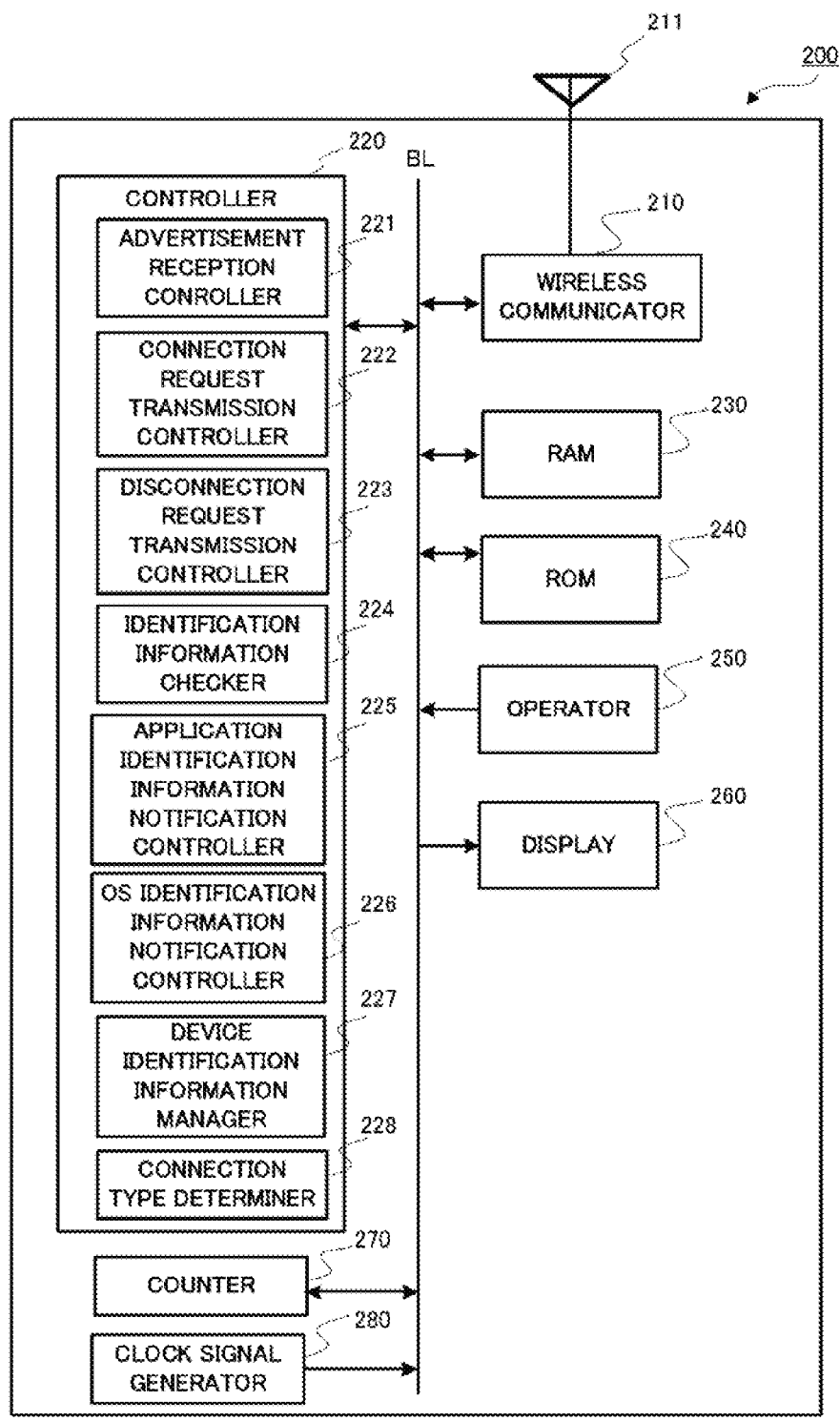
FIG. 3 is a block diagram illustrating an example structure of a central according to an embodiment.

As illustrated in FIG. 3, the central 200 includes a wireless communicator 210, a controller 220, a RAM 230, a ROM 240, an operator 250, a display 260, a counter 270, and a clock signal generator 280, all connected together via a bus line BL.

The wireless communicator 210 includes, for example, an RF circuit, a BB circuit, and an LSI circuit. The wireless communicator 210 performs a wireless communication to the peripheral 100 that is the other wireless communication device based on the BLE via an antenna 211.

The controller 220 includes, for example, a CPU. The controller 220 executes various programs stored in the ROM 240, thereby controlling the entire action of the central 200.

The RAM 230 includes a volatile memory, and is utilized as a work area to temporarily store data in order to enable the controller 220 to execute various processes.

The ROM 240 includes a non-volatile memory like a flash memory, and stores the various programs and data for enabling the controller 220 to control various functions.

The operator 250 is an interface which includes a touch panel, and the like, and allows a user to enter an instruction.

The display 260 includes, for example, an LCD or an EL display, and displays an image in accordance with image data input from the controller 220.

The counter 270 includes a counter circuit that counts the number of pulses of the clock signal from the local device (central 200). The counter 270 checks the clock time based on the counted number of pulses. In addition, the controller 220 executes various controls at a timing based on the counted number of pulses by the counter 270.

The clock signal generator 280 includes a crystal oscillator that generates a reference clock, and a variable PLL circuit that generates a clock signal at a desired frequency from the reference clock, and the like, and generates the clock signal of the local device (central 200). The frequency of the clock signal is to be controlled by changing the frequency dividing ratio by the variable PLL circuit.

Next, an explanation will be given of a functional structure of the controller 220 in the central 200. The controller 220 functions as an advertisement reception controller 221, a connection request transmission controller 222, a disconnection request transmission controller 223, an identification information checker 224, an application identification information notification controller 225, an OS identification information notification controller 226, a device identification information manager 227, and a connection type determiner 228.

The advertisement reception controller 221 causes the wireless communicator 210 to receive the transmitted advertisement from the peripheral 100 based on a scanning instruction. Hence, the central 200 recognizes the presence of the peripheral 100. An example user operation for the scanning instruction is an activation of an application to utilize the service available from the peripheral 100. In addition, the scanning instruction may be given not only based on the user operation but also at a constant cycle after the activation of the application.

The connection request transmission controller 222 causes the wireless communicator 210 to transmit a signal indicating the connection request, thereby requesting the connection to the peripheral 100. The connection request is transmitted when the connection is necessary after the transmitted advertisement from the peripheral 100 is received.

The disconnection request transmission controller 223 causes the wireless communicator 210 to transmit a signal indicating the disconnection request, and requests the disconnection to the connected peripheral 100. When, for example, the data communication with the connected peripheral 100 has completed, or when the user gives the disconnection operation, the disconnection request is transmitted.

The identification information checker 224 obtains the application identification information and the OS identification information both notified by the peripheral 100 via the wireless communicator 210 and the antenna 211. The identification information checker 224 checks whether the obtained application identification information and OS identification information match the application identification information of the local device (central 200) and the OS identification information thereof stored in the ROM 240.

The application identification information notification controller 225 reads the application identification information on the installed application in the local device from the ROM 240. Next, the application identification information notification controller 225 causes the wireless communicator 210 to transmit the read application identification information from the ROM 240, thereby giving a notification to the peripheral 100.

The OS identification information notification controller 226 reads the OS identification information on the installed OS in the local device from the ROM 240. Next, the OS identification information notification controller 226 causes the wireless communicator 210 to transmit the read OS identification information from the ROM 240, thereby giving a notification to the peripheral 100.

The device identification information manager 227 manages the device identification information on the other wireless communication device (peripheral 100) stored in the ROM 240.

More specifically, the device identification information manager 227 stores, in the ROM 240, the device identification information contained in the received advertisement from the peripheral 100. In addition, when the identification information checker 224 determines that the obtained application identification information and OS identification both from the peripheral 100 do not match the application identification information on the local device (central 200) and the OS identification information thereof both stored in the ROM 240, the device identification information manager 227 deletes the device identification information on the peripheral 100 stored in the ROM 240.

The connection type determiner 228 determines the purpose of the received connection type from the peripheral 100. The controller 220 executes the subsequent control process in accordance with this determination result.

Figure 4:
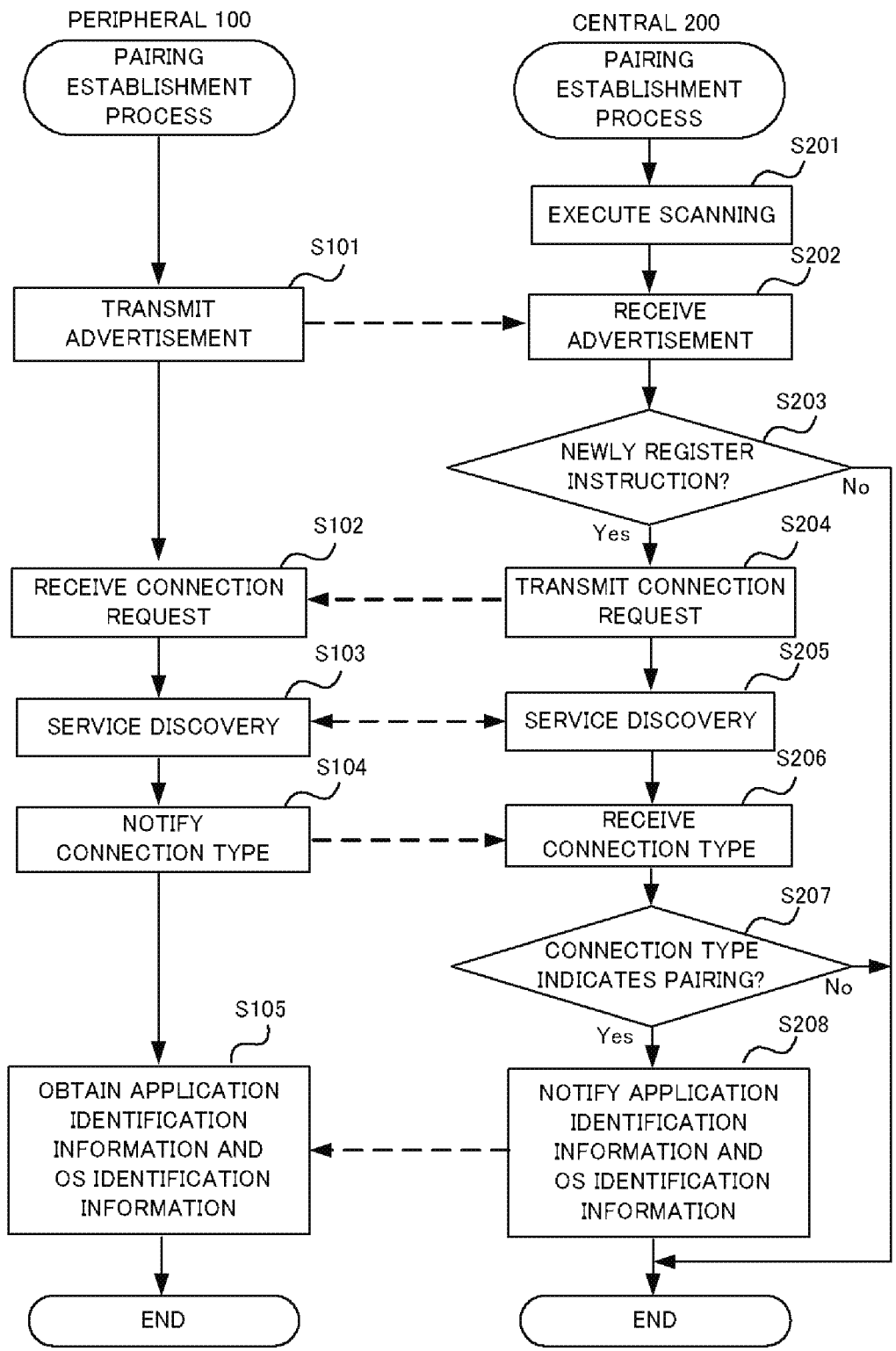
FIG. 4 is a flowchart illustrating an example pairing establishment process between the peripheral and the central.

Next, with reference to FIG. 4, the pairing establishment process between the peripheral 100 and the central 200 will be explained with reference to FIG. 4.

This process is executed upon a predetermined operation given by the user. An example predetermined operation is that the user activates the communication function of the peripheral 100 based on the Bluetooth through the operator 150, activates the application in the central 200 through the operator 250, and displays a new connection screen (operation screen for pairing establishment process) on the display 260.

First, the controller 120 of the peripheral 100 transmits (step S101) the advertisement to the central 200.

The controller 220 of the central 200 performs scanning (step S201), and receives (step S202) the transmitted advertisement from the peripheral 100. The controller 220 of the central 200 stores, in the ROM 240, the device identification information on the peripheral 100 contained in the advertisement.

Upon receiving the advertisement, the controller 220 of the central 200 displays, on the display 260, an operation screen to enter the user operation as to whether or not to newly register. In this case, the controller 220 of the central 200 determines (step S203) whether or not the entered user operation is to newly register.

When the controller 220 of the central 200 determines (step S203: NO) that the entered user operation is not to newly register, the controller 220 of the central 200 skips the subsequent processes (steps S204-S208), and ends the pairing establishment process. In this case, since the controller 220 of the central 200 does not transmit the connection request to the peripheral 100, the controller 120 of the peripheral 100 also skips the subsequent processes (steps S102-S105), and ends the pairing establishment process.

When the controller 220 of the central 200 determines (step S203: YES) that the entered user operation is to newly register, the controller 220 of the central 200 transmits (step S204) the connection request to the peripheral 100.

The controller 120 of the peripheral 100 receives (step S102) the transmitted connection request from the central 200, and establishes the connection.

Once the connection is established, the controller 120 of the peripheral 100 and the controller 220 of the central 200 perform service discovery (steps S103, S205). This enables the peripheral 100 and the central 200 to execute the subsequent processes.

Upon completion of the service discovery, the controller 120 of the peripheral 100 notifies (step S104) the central 200 of the connection type. Note that the connection type is a type determined based on the details of the above predetermined operation (for example, depression of operation button for long time or not) that is an event starting the pairing establishment process.

The controller 220 of the central 200 receives (step S206) the connection type notified by the peripheral 100.

In this case, the controller 220 of the central 200 determines (step S207) whether or not the received connection type indicates an execution of the pairing establishment process.

When determining (step S207: NO) that the received connection type does not indicate an execution of the pairing establishment process, the controller 220 of the central 200 skips the next process (step S208), and ends the pairing establishment process. In this case, since the controller 220 of the central 200 does not transmit the application identification information and the OS identification information to the peripheral 100, the controller 120 of the peripheral 100 also skips the next process (step S105), and ends the pairing establishment process.

When determining (step S207: YES) that the received connection type indicates an execution of the pairing establishment process, the controller 220 of the central 200 notifies (step S208) the peripheral 100 of the application identification information and the OS identification information.

The controller 120 of the peripheral 100 obtains (step S105) the application identification information and the OS identification information both notified by the central 200, and stores those pieces of information in the ROM 140. The subsequent process is not illustrated due to the restriction of illustration, but the controller 120 of the peripheral 100 notifies the central 200 of the storing of the application identification information and the OS identification information, and the central 200 receives such a notification. Subsequently, the control process or the communication in accordance with the connection type is executed between the central 200 and the peripheral 100. Hence, the pairing establishment process completes.

Next, with reference to FIG. 5, an explanation will be given of the re-connection process between the peripheral 100 and the central 200 as explained above. The re-connection process is a process of establishing a re-connection between the peripheral 100 and the central 200 after the execution of the pairing establishment process. This process is executed upon a user operation or an automatic control process at a constant cycle.

When the re-connection process starts, the controller 220 of the central 200 performs scanning (step S401) at a constant cycle. In this case, when the controller 120 of the peripheral 100 transmits (step S301) the advertisement, the controller 220 of the central 200 receives (step S402) this advertisement upon a constant scanning.

When receiving the advertisement, the controller 220 of the central 200 transmits (step S403) the connection request to the peripheral 100. The controller 120 of the peripheral 100 receives (step S302) the transmitted connection request from the central 200, and establishes the connection.

Subsequently, the controller 120 of the peripheral 100 reads the application identification information and the OS identification information both stored in the ROM 140, and notifies (step S303) the central 200 of those pieces of information. The controller 220 of the central 200 receives (step S404) the application identification information and the OS identification information both notified by the peripheral 100.

In this case, the controller 220 of the central 200 checks (step S405) whether the application identification information and the OS identification information both obtained from the peripheral 100 match the application identification and the OS identification information on the application and the OS both installed in the local device (central 200).

When the controller 220 determines (step S405: Yes) that the application identification information and the OS identification information match, the connection between the peripheral 100 and the central 200 is maintained. Next, the controller 220 of the central 200 requests the connection type to the peripheral 100. The controller 120 of the peripheral 100 that has received the request for the connection type notifies (step S304) the central 200 of the connection type. The controller 220 of the central 200 receives (step S407) the connection type notified by the peripheral 100. Subsequently, the control process or the communication in accordance with the connection type is executed between the central 100 and the peripheral 200 (steps S305, S408).

When determining (step S405: NO) that the application identification information and the OS identification information do not match, the controller 220 of the central 200 transmits the disconnection request to the peripheral 100 to disconnect the connection thereto, and deletes (step S406) the device identification information on the peripheral 100 stored in the ROM 240. Subsequently, the controller 120 of the peripheral 100 and the controller 220 of the central 200 return the process to the steps S301, S401, and repeat the above-explained re-connection process.

As explained above, the controller 220 of the central 200 notifies, in the step S208 of the pairing establishment process, the peripheral 100 of the application identification information on the local device. In addition, the controller 220 of the central 200 stores, in the step S202 of the pairing establishment process, the device identification information on the peripheral received therefrom in the ROM 240.

Conversely, the controller 120 of the peripheral 100 receives, in the step S105 of the pairing establishment process, the application identification information on the central 200 therefrom, and stores the received information in the ROM 140.

According to this structure, as for the pairing establishment between the peripheral 100 and the central 200, the pairing is simply established by the peripheral 100 that stores the application identification information on the central 200 and the OS identification information thereon, and the central 200 that stores the device identification information on the peripheral 100. Hence, generation of information like a shared key, and information sharing between the peripheral 100 and the central 200 are unnecessary in establishing the pairing.

Next, the controller 120 of the peripheral 100 notifies, in the step S303 of the re-connection process for the connection to the central 200, the central 200 of the application identification information and the OS identification information both stored in the ROM 140, and when those pieces of information do not match the application identification information on the central 200 and the OS identification information thereon, the connection between the peripheral 100 and the central 200 is disconnected, and the central 200 deletes the device identification information on the peripheral 100 stored in the ROM 240.

According to this structure, when, for example, after the peripheral 100 has established the pairing to the central 200, a pairing is established to another central (unillustrated), the application identification information on the central 200 and the OS identification information thereon both stored in the ROM 140 are updated to the application identification information on such another central (unillustrated) and the OS identification information thereon. Next, when the peripheral 100 attempts to establish a re-connection to the central 200, the central 200 deletes the device identification information on the peripheral 100 stored in the ROM 240.

Hence, the user does not need an operation of canceling the pairing between the peripheral 100 and the central 200. In addition, although the operation of canceling the pairing between the peripheral 100 and the central 200 is not made, the peripheral 100 is capable of establishing the pairing to another central (unillustrated).

Still further, according to this structure, in two wireless communication devices that share a shared key as the pairing information, when a re-connection or an establishment of pairing is attempted with the pairing information being deleted from the memory of only either wireless communication device, an unclear operation or control process is not required. Hence, an occurrence of error originating from such an unclear operation or control process does not happen.

As explained above, according to the peripheral 100 and the central 200 both in this embodiment, the operation relating to the pairing is simplified, thereby improving the user friendliness.

The explanation for the embodiment ends up to the above paragraph, but the above embodiment is merely an example. Hence, the specific structure of the peripheral 100 and that of the central 200, and the specific process details are not limited to the examples explained in the above embodiment. A modified example of the above embodiment will be explained below.

Modified Example

In the above embodiment, the pairing establishment process and the re-connection process are executed by the controller 120 of the peripheral 100 and the controller 220 of the central 200. However, the peripheral 100 and the central 200 each may include multiple controllers, and those multiple controllers may cooperatively execute the pairing establishment process and the re-connection process. That is, the advertisement transmission controller 121, the connection establisher 122, the connection disconnector 123, the application identification information obtainer 124, the OS identification information obtainer 125, the identification information notification controller 126, and the connection type notification controller 127 may be a single controller, or multiple controllers may be provided for the respective components to perform respective actions. In addition, the advertisement reception controller 221, the connection request transmission controller 222, the disconnection request transmission controller 223, the identification information checker 224, the application identification information notification controller 225, the OS identification information notification controller 226, the device identification information manager 227, and the connection type determiner 228 may be a single controller, or multiple controllers may be provided for the respective components to perform respective actions.

In the above embodiment, the controller 120 of the peripheral 100 stores, in the step S105 of the pairing establishment process, the obtained OS identification information in the ROM 140. In addition, the controller 120 of the peripheral 100 notifies, in the step S303 of the re-connection process, the central 200 of the OS identification information, and the central 200 determines whether or not the obtained OS identification information also matches the OS identification information on the central 200.

However, the present disclosure is not limited to such an embodiment. In the pairing establishment process, the peripheral 100 may store only the application identification information, and may store no OS identification information. In the re-connection process, the central 200 may simply determine whether or not the obtained application identification information matches the application identification information on the central 200. In other words, the notification of the OS identification information from the central 200 to the peripheral 100 is necessary for the subsequent communication, but whether or not to give a notification of the OS identification information for other purposes is optional.

In the above embodiment, the peripheral 100 and the central 200 store the obtained data in the ROM 140 and the ROM 240, respectively. However, the present disclosure is not limited to such a structure. The peripheral 100 and the central 200 may store the obtained data in not the ROMs 140, 240, but the RAMs 130, 230, respectively. That is, where the obtained data is to be stored is any memories, such as the RAM and the ROM.

In the above embodiment, the peripheral 100 and the central 200 start executing the pairing establishment process upon the predetermined operation given by the user. However, the event to start the pairing establishment process is not limited to such a user operation. For example, when the central 200 receives an advertisement from the peripheral 100, the central 200 may determine whether or not the device identification information on the peripheral 100 contained in the advertisement matches any device identification information stored in the ROM 240, and when there is no matching information, the pairing establishment process may be executed.

In the above embodiment, the example wireless communication devices are the peripheral 100 and the central 200 that perform wireless communication based on the BLE. However, the present disclosure is not limited to wireless communication devices that perform wireless communication based on the BLE. For example, the present disclosure is also applicable to wireless communication devices that perform wireless communication based on Wi-Fi (Registered Trademark) or ZigBee (Registered Trademark), and the like.

In addition, the peripheral 100 and the central 200 according to the present disclosure are not limited to the above wireless communication devices, and the function of the peripheral 100 and that of the central 200 may be accomplished by a computer that executes a program. The program to accomplish the function of the peripheral 100 and that of the central 200 may be stored in a non-transitory computer readable recording medium, such as a Universal Serial Bus (USB) memory, a Compact Disc-Read Only Memory (CD-ROM), a Digital Versatile Disc (DVD), or a Hard Disk Drive (HDD), and may be downloaded to a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application is based on Japanese Patent Application No. 2016-006284 filed on Jan. 15, 2016, the entire contents of the specification, claims, and drawings of which are herein incorporated in this specification by reference.

REFERENCE SIGNS LIST

1 Wireless communication system
100 Peripheral (electronic watch)
110, 210 Wireless communicator
111, 211 Antenna
120, 220 Controller
121 Advertisement transmission controller
122 Connection establisher
123 Connection disconnector
124 Application identification information obtainer
125 OS identification information obtainer
126 Identification information notification controller
127 Connection type notification controller
130, 230 RAM
140, 240 ROM
150, 250 Operator
160, 260 Display
170, 270 Counter
180, 280 Clock signal generator
200 Central (wireless communication terminal)
221 Advertisement reception controller
222 Connection request transmission controller 223 Disconnection request transmission controller
224 Identification information checker
225 Application identification information notification controller
226 OS identification information notification controller
227 Device identification information manager
228 Connection type determiner

The invention claimed is:

1. A wireless communication method comprising:
notifying a wireless communication device of application identification information on a local device;
obtaining, from the wireless communication device, the application identification information stored in a memory of the wireless communication device when connecting to the wireless communication device; and
controlling a connection so as to maintain the connection when the application identification information obtained from the wireless communication device matches the application identification information on the local device, and to disconnect the connection when the application identification information obtained from the wireless communication device does not match the application identification information on the local device.

2. The wireless communication method according to claim 1, further comprising:
storing device identification information on the wireless communication device received from the wireless communication device in a memory of the local device; and
deleting the device identification information on the wireless communication device stored in the memory of the local device when the application identification information obtained from the wireless communication device does not match the application identification information on the local device.

3. The wireless communication method according to claim 1, further comprising:
further notifying the wireless communication device of operating system (OS) identification information on the local device;
obtaining, from the wireless communication device, the application identification information and the OS identification information both stored in the memory of the wireless communication device when connecting to the wireless communication device; and
controlling the connection so as to maintain the connection when the application identification information and the OS identification information both obtained from the wireless communication device match the application identification information and the OS identification information on the local device, and to disconnect the connection when the application identification information and the OS identification information both obtained from the wireless communication device does not match the application identification information and the OS identification information on the local device.

4. The wireless communication method according to claim 3, further comprising:
determining whether the application identification information and the OS identification information both obtained from the wireless communication device matches the application identification information and the OS identification information on the local device.

5. The wireless communication method according to claim 1, comprising:
determining whether the application identification information obtained from the wireless communication device matches the application identification information on the local device.

6. A non-transitory recording medium having stored therein a computer readable program, the computer readable program causing a computer to at least:
notify a wireless communication device of application identification information on a local device;
obtain, from the wireless communication device, the application identification information stored in a memory of the wireless communication device when connecting to the wireless communication device; and
control a connection so as to maintain the connection when the application identification information obtained from the wireless communication device matches the application identification information on the local device, and to disconnect the connection when the application identification information obtained from the wireless communication device does not match the application identification information on the local device.

7. The non-transitory recording medium according to claim 6, wherein the computer readable program causes the computer to:
store device identification information on the wireless communication device received from the wireless communication device in a memory of the local device; and
delete the device identification information on the wireless communication device stored in the memory of the local device when the application identification information obtained from the wireless communication device does not match the application identification information on the local device.

8. The non-transitory recording medium according to claim 6, wherein the computer readable program causes the computer to:
further notify the wireless communication device of operation system (OS) identification information on the local device;
obtain, from the wireless communication device, the application identification information and the OS identification information both stored in the memory of the wireless communication device when connecting to the wireless communication device; and
control the connection so as to maintain the connection when the application identification information the OS identification information both obtained from the wireless communication device match the application identification information and the OS identification information on the local device, and to disconnect the connection when the application identification information and the OS identification information both obtained from the wireless communication device does not match the application identification information and the OS identification information on the local device.

9. The non-transitory recording medium according to claim 8, wherein the computer readable program causes the computer to:
determine whether the application identification information and the OS identification information both obtained from the wireless communication device match the application identification information and the OS identification information on the local device.

10. The non-transitory recording medium according to claim 6, wherein the program causes the computer to:
  determine whether the application identification information obtained from the wireless communication device matches the application identification information on the local device.

11. A local device comprising:
a memory; and
one or more controllers configured to:
  control a wireless communication circuit to notify a wireless communication device of application identification information on the local device;
  control the wireless communication circuit to obtain, from the wireless communication device, the application identification information stored in a memory of the wireless communication device when connecting to the wireless communication device; and
  control a connection so as to maintain the connection when the application identification information obtained from the wireless communication device matches the application identification information on the local device, and to disconnect the connection when the application identification information obtained from the wireless communication device does not match the application identification information on the local device.

12. The local device according to claim 11,
wherein the one or more controllers are configured to:
  store device identification information on the wireless communication device received from the wireless communication device in the memory of the local device;
  delete the device identification information on the wireless communication device stored in the memory of the local device when the application identification information obtained from the wireless communication device does not match the application identification information on the local device.

13. The local device according to claim 11,
wherein the one or more controllers are configured to:
  control the wireless communication circuit to further notify the wireless communication device of operating system (OS) identification information on the local device;
  control the wireless communication circuit to obtain, from the wireless communication device, the application identification information and the OS identification information both stored in the memory of the wireless communication device when connecting to the wireless communication device; and
  control the connection so as to maintain the connection when the application identification information and the OS identification information both obtained from the wireless communication device match the application identification information and the OS identification information on the local device, and to disconnect the connection when the application identification information and the OS identification information both obtained from the wireless communication device does not match the application identification information and the OS identification information on the local device.

14. The local device according to claim 13,
wherein the one or more controllers are configured to:
  determine whether the application identification information and the OS identification information both obtained from the wireless communication device match the application identification information and the OS identification information on the local device.

15. The local device according to claim 11,
wherein the one or more controllers are configured to:
  determine whether the application identification information obtained from the wireless communication device matches the application identification information on the local device.

16. A system comprising:
a wireless communication device; and
a local device comprising:
  a memory; and
  one or more controllers configured to:
    control a wireless communication circuit to notify the wireless communication device of application identification information on the local device;
    storing device identification information on the wireless communication device received from the wireless communication device in the memory of the local device;
    control the wireless communication circuit to obtain, from the wireless communication device, the application identification information stored in a memory of the wireless communication device when connecting to the wireless communication device; and
    control a connection so as to maintain the connection when the application identification information obtained from the wireless communication device matches the application identification information on the local device, and to disconnect the connection when the application identification information obtained from the wireless communication device does not match the application identification information on the local device.

* * * * *